United States Patent [19]

Kiss

[11] Patent Number: 4,507,983
[45] Date of Patent: Apr. 2, 1985

[54] ENERGY STORAGE FLYWHEEL USING LIQUID CRYSTALLINE POLYMER TAPE

[75] Inventor: Gabor D. Kiss, Summit, N.J.

[73] Assignee: Celanese Corporation, New York, N.Y.

[21] Appl. No.: 462,165

[22] Filed: Jan. 31, 1983

[51] Int. Cl.³ .................... F16F 15/30; B32B 31/30
[52] U.S. Cl. .................................. 74/572; 428/65;
428/906; 156/184; 156/192; 156/244.18;
156/244.23; 156/244.25
[58] Field of Search ............... 74/572; 428/65, 906;
156/162, 184, 192, 244.18, 244.25, 244.23

[56] References Cited

U.S. PATENT DOCUMENTS

| | | | |
|---|---|---|---|
| 3,964,341 | 6/1976 | Rabenhorst | 74/572 |
| 3,982,447 | 9/1976 | Rabenhorst | 74/572 |
| 4,020,714 | 5/1977 | Rabenhorst | 74/572 |
| 4,023,437 | 5/1977 | Rabenhorst | 74/572 |
| 4,080,845 | 3/1978 | Hatch | 74/572 |
| 4,138,286 | 2/1979 | Chevrolat et al. | 74/572 X |
| 4,187,738 | 2/1980 | Knight, Jr. et al. | 74/572 |

Primary Examiner—Alexander S. Thomas
Attorney, Agent, or Firm—Burnes, Doane, Swecker & Mathis

[57] ABSTRACT

The present invention comprises a flywheel made from a unitary tape of liquid crystalline polymer. Such a flywheel is readily prepared according to the present invention by utilizing a unitary tape of liquid crystalline polymer, since a reduced amount of winding is required as compared to the use of filamentary materials without a binding resin. Even in comparison to filamentary tapes, the present invention is advantageous since almost the entire flywheel can be made of liquid crystalline polymer without the necessity of a composite or other binding which is necessary when high strength filamentary materials are used. The present invention allows complex flywheel profiles required for maximum energy density to be more easily produced.

19 Claims, 4 Drawing Figures

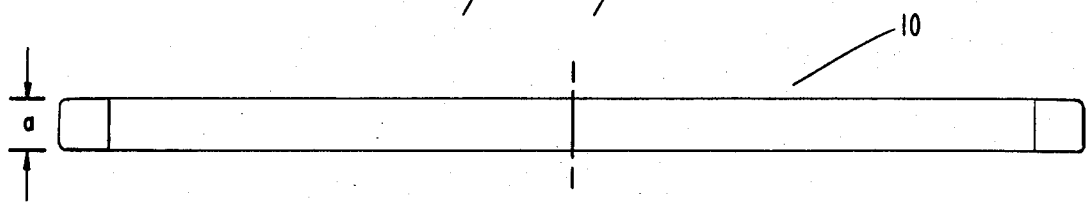
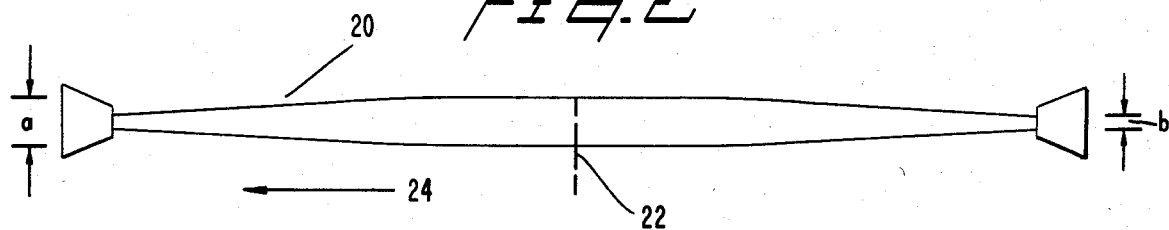
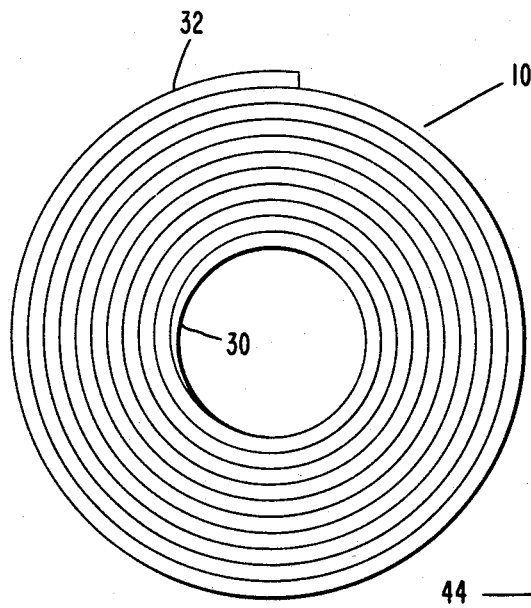
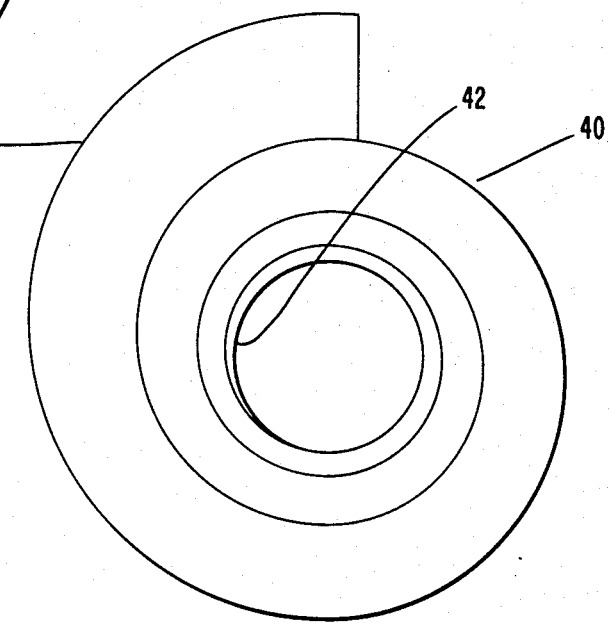

ENERGY STORAGE FLYWHEEL USING LIQUID CRYSTALLINE POLYMER TAPE

BACKGROUND OF THE INVENTION

1. Field of the Invention

The present invention relates to flywheels, and more particularly, to composite flywheels made from a unitary tape of liquid crystalline polymer.

2. Description of the Prior Art

Energy storage flywheels are being examined increasingly for use in transportation applications by making use of regenerative braking. Other uses for such flywheels are utility load leveling, storage of energy generated by solar or wind generators, and other similar uses.

The first flywheels used in such applications were made of metal. However, failure of metallic flywheels at high speeds often results in chunks of metal being released at high velocities. This necessitated the use of heavy safety housings to shield against such failures.

As an alternative to metallic elements, composite flywheels using ultrahigh strength fibers have been developed over the last few years. Such composites enable the power energy densities to be improved significantly while also allowing the use of lighter safety housings. The limitations of this approach are the slow, complex winding process; the need for post fabrication cure; and the packing density of the fibers which is limited in practice to 70 to 80 percent of the total volume. Moreover, composite flywheels, while possessing a more benign failure mode than metallic elements, still are subject to delamination at rotation speeds below which failure would occur due to tensile fracture under centrifugal loading.

Obviously, the faster a flywheel can be rotated, the more energy it can store. Thus it is advantageous to be able to produce composite flywheels which can be rotated as rapidly as possible. However, delamination can sometimes occur because the stress on an element varies as the square of the distance from the center of rotation. Assuming that the modulus of elongation of the elements making up the flywheel is constant throughout the flywheel, the strain in any individual element will be proportional to the square of the radial distance, since the types of fibers used are nearly linearly elastic (glass, graphite, and Kevlar (trademark of DuPont de Nemours and Company for an aromatic polyamide fiber)). Thus the elongation of elements at the periphery of the flywheel will be greater than that of elements closer to the axis. As a result, the flywheel breaks into concentric rings at rotation speeds below that which would be needed to break the individual elements. Accordingly, various attempts have been made to overcome this delamination problem.

For example, Rabenhorst, U.S. Pat. No. 3,964,341, describes a flywheel structure which is provided with a rim portion of multiple rings or winding of filamentary material having high tensile strength which are bonded or otherwise held together at a predetermined number of localized areas, so that major portions of the individual rings or windings may expand with a minimum of constraints during rotation of the flywheel structure.

Another approach is Rabenhorst, U.S. Pat. No. 3,982,447, which describes a flywheel formed of discrete annular rings of anisotropic filamentary material disposed within the rings in a "wound" configuration, wherein the upper and lower edges of each ring are attached alternately to the edges on adjacent rings in a radial orientation to form a structure having a bellows-like or convoluted cross-section. Such a structure is stated to be subject to unusually low radial stress within the material when rotating.

Rabenhorst, U.S. Pat. No. 4,020,714, describes a flywheel of wound filaments or discrete rings of essentially anisotropic material formed into a rim or disc-like configuration. Pairs of adjacent rings or windings in any given plane perpendicular to the axis of rotation are tied or bound together at discrete points at selected locations while adjacent rings which are not bound at these tie points are tied together at other points in between the first tie points. These points of connection extend linearly throughout the structure. Such an arrangement is stated to allow the individual rings to radially expand by bending in a radial direction thereby reducing the loading along the line of tie points as compared to a structure where all the rings or windings are tied together at all locations.

Rabenhorst, U.S. Pat. No. 4,023,437, discloses flywheels formed of wound anisotropic material. A disc-like flywheel is formed of windings of anisotropic filaments wherein the filaments are provided with a relatively thin sheath of flexible material around each filament so that the sheath provides positive contact between adjacent windings even during deformation of the winding caused by rotation of the structure.

Hatch, U.S. Pat. No. 4,080,845 discloses a composite flywheel with a conical or concave shape. Upon rotation, the surfaces of the flywheel tend to flatten with a resultant increase in radius measured from the axis of rotation. Such an increase in radius, while permitting the disc to flatten, is said to have the effect of substantially eliminating radial stresses within the flywheel. Such a flywheel is stated to be readily prepared from pre-impregnated fiber bundles or tapes.

Chevrolat et al, U.S. Pat. No. 4,138,286, teaches the preparation of a flywheel by winding a continuous filament impregnated with a hardenable polymer onto a mandrel. By the use of such a filament, it is suggested that polymerization will have progressed sufficiently at the end of the winding operation so that the polymer will not flow during the hardening operation. In addition it is suggested to use windings of at least two filaments having different moduli of elasticity so that the filament which has the lowest modulus of elasticity is in the portion nearest the mandrel and the filament which has the highest modulus of elasticity is in the peripheral portion. In addition it is suggested that the winding of a filament can be carried out under a constant or slightly decreasing tension from the central zone to the periphery.

Knight, Jr. et al, U.S. Pat. No. 4,187,738 is directed to an improved rim for a flywheel. The rim is fabricated from resin impregnated filamentary material which is circumferentially wound in a side-by-side relationship to form a plurality of discretely and sequentially formed concentric layers of filamentary material that are bound together in a resin matrix. Each layer is prestressed to a prescribed tension loading during winding and then cured prior to forming the next layer such that when finished, the various layers will have been placed in a distribution which counterbalances the radial tensile stresses generated during rotation of the rim.

From the above, it can be seen that various more or less complicated procedures have been proposed for dealing with the problem of delamination. The attempted solutions discussed above fall in three general categories.

In the first category, the rings of the flywheel are bound at a small number of locations which allows the flywheel to change shape during rotation, or in the alternative, the flywheel is wound using a schedule of increasing prestress levels in concentric layers. However, since such flywheels must be made from fibers with multiple winding being required for each level, the number of bindings which must be made or the need to cure between each layer results in a large increase in the production time of a flywheel.

The second category is based upon a relaxation of the assumption that the modulus of the elements must be constant throughout the flywheel. These attempted solutions either explicitly state that the filament having the lowest modulus should be closest to the axis, or in the alternative, suggest that their structures overcome such a need for varying the modulus due to the structure disclosed.

The third category is that of a ballasted flywheel. In such an approach, the stress is made more uniform by adding ballast near the center of the flywheel, usually in the form of heavy powders such as lead, with a slight penalty in the energy/weight storage. However, adding ballast to the flywheels of the prior art is rather difficult due to the use of fine filaments such as Kevlar (trademark of DuPont de Nemours and Company for an aromatic polyamide fiber) or graphite.

As discussed above, most of the prior art discusses the use of filaments such as Kevlar (trademark of DuPont de Nemours and Company for an aromatic polyamide fiber) and graphite. However, certain of the above, including Hatch and Rabenhorst U.S. Pat. No. 3,964,341 mention the use of "tapes". However such tapes are in actuality flat prepregs, i.e., filamentary elements within a matrix formed into a flat tape. Such tapes must be partially cured before being wound into a flywheel and are not homogeneous across the tape width. Rather, the strength elements are not continuous at any point across the width, being distributed instead on a discontinuous basis.

Accordingly, a need exists for composite flywheels which are more readily manufactured while also having a reduced susceptiblity to delamination.

SUMMARY OF THE INVENTION

The present invention comprises a flywheel made from a unitary tape of thermotropic liquid crystalline polymer. Such a flywheel is more readily prepared than when filaments are used without a binding resin since a reduced amount of winding is required. Furthermore, the present invention is advantageous over the use of filamentary tapes since almost the entire flywheel can be made of liquid crystalline polymer without the necessity of a resin matrix or other binding which must be used when filamentary materials are employed in making a composite flywheel.

According to the present invention, a flywheel can be manufactured by extruding, drawing and winding a unitary tape of a liquid crystalline polymer in a continuous process. Moreover, complex flywheel profiles required for maximum energy density can be more easily created by varying the width of the tape during winding by the use of a slitting mechanism.

In one preferred embodiment, the tape has a continuously increasing thickness as winding proceeds. Thus thinner tape elements near the center of the flywheel elongate to the same extent as thicker tape elements near the periphery under the radially varying stress present in a rotating flywheel.

In an alternate preferred embodiment, the tape can be made with a varying level of modulus which is determined by the drawdown in the melt state. By continuously increasing the drawdown of the tape as the flywheel is wound, modulus can be varied as a function of the radius. Thus low modulus tape can be used near the center and high modulus tape near the periphery, giving relatively uniform strength throughout the flywheel while it is spinning.

In an alternate preferred embodiment, liquid crystalline polymer compositions which increase in modulus with heat treatment are used to prepare the tape. In such case, a programmed heat treatment is used to increase the modulus of the elements as they are being wound onto the flywheel, with the increase in modulus being proportional to the radial distance from the center of the flywheel.

In an alternate preferred embodiment, a ballasted flywheel is prepared by incorporating heavy metal powders as fillers in the portion of the tape near the center of the flywheel with the amount of ballast decreasing as the periphery of the flywheel is approached. In the alternative, varying quantities of powder can be adhered to the tape immediately prior to winding using the same amount as in the case where the ballast is actually blended with the liquid crystalline polymer prior to producing the tape.

BRIEF DESCRIPTION OF THE DRAWINGS

FIG. 1 is a diagram illustrating a constant thickness profile flywheel of the present invention.

FIG. 2 is a diagram illustrating a tapered thickness "Stodola" profile flywheel according to the present invention.

FIG. 3 is a side view of the flywheel illustrated in FIG. 1.

FIG. 4 is a side view of a preferred embodiment of the present invention which illustrates, in an exaggerated form, the formation of a flywheel wherein the thickness of the tape used to form the flywheel increases as additional material is wound.

DESCRIPTION OF THE PREFERRED EMBODIMENTS

Thermotropic liquid crystalline polymers are used to make the flywheels of the present invention. Liquid crystalline polymers are particularly advantageous for use in the present invention since they can be formed into a unitary tape which can be narrow or as wide as the widest point on the flywheel. If a tape is used which is wider than the widest point of the flywheel, then a slitting mechanism can be used to slice the tape, thus allowing the flywheel to be wound with an appropriate profile.

By "unitary tape" is meant a non-filamentary tape extruded as a single entity which is homogeneous when viewed in cross section across its width, with the exception of the possible incorporation of particulate ballast. This should be contrasted with the tapes referred to in the prior art which employ a plurality of anisotropic filaments within a resin matrix.

One advantage of using a unitary tape of liquid crystalline polymer to make a flywheel is that the entire tape has the desired mechanical properties rather than having 70-80% of reinforcing material in some type of resin matrix. In the prior art, the only materials which had a high modulus and tensile strength were not meltable. Since such materials were not meltable, they had to be made into filaments rather than a unitary tape. Thus, they had to be wound, a rather tedious process when single filaments were used, and then somehow bound together by external fastening means or the use of resins. While filamentary tapes reduced the amount of winding, they also resulted in a significant reduction in the physical properties of the flywheel because the resin matrix used in forming the tape did not act as reinforcement.

In contrast, the utilization of thermotropic crystalline polymers allows a unitary tape to be produced which can then be wound into a flywheel such that almost the entire contents of the flywheel act as reinforcing material with only a small amount of a substance such as a melt or curable adhesive being used to give the flywheel integrity. Although the properties of liquid crystalline polymers are conducive to the use of heat fusion to bind the layers together, the use of an adhesive is preferred.

Representative classes of polymers from which the thermotropic liquid crystalline polymer suitable for use in the present invention may be selected include wholly aromatic polyesters, aromatic-aliphatic polyesters, wholly aromatic poly (ester-amides), aromatic-aliphatic poly(ester-amides), aromatic polyazomethines, aromatic polyester-carbonates, and mixtures of the same. In preferred embodiments the thermotropic liquid crystalline polymer is a wholly aromatic polyester, a wholly aromatic poly(ester-amide), or an aromatic-aliphatic poly(esteramide). In such wholly aromatic polyester and wholly aromatic poly(ester-amide) each moiety present within the polymer chain contributes at least one aromatic ring. Also, it is preferred that naphthalene moieties be included in the thermotropic liquid crystalline polymer, e.g., 6-oxy-2-naphthoyl moiety, 2,6-dioxynaphthalene moiety, or 2,6-dicarboxynaphthalene moiety, in a concentration of not less than about 10 mole percent. The particularly preferred naphthalene moiety for inclusion in the thermotropic liquid crystalline polymer is the 6-oxy-2-naphthoyl moiety in a concentration of not less than about 10 mole percent.

Representative wholly aromatic polyesters which exhibit thermotropic liquid crystalline properties include those disclosed in the following U.S. Pat. Nos. which are herein incorporated by reference 3,991,013; 3,991,014; 4,066,620; 4,067,852; 4,075,262; 4,083,829; 4,093,595; 4,118,372; 4,130,545; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,279,803; 4,294,955; 4,299,756; 4,318,841; 4,337,190; and 4,337,191; and 4,355,134. As discussed hereafter the wholly aromatic polyesters of U.S. Pat. Nos. 4,161,470 and 4,256,624 are particularly preferred for use in the present invention.

Representative aromatic-aliphatic polyesters which exhibit thermotropic liquid crystalline properties are copolymers of polyethylene terephthalate and hydroxybenzoic acid as disclosed in *Polyester X-7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1-4. A further disclosure of such copolymers can be found in "Liquid Crystal Polymers: I Preparation and Properties of p-Hydroxybenzoic Acid Copolymers, *Journal of Polymer Science, Polymer Chemistry Edition*, Vol. 14, pages 2043 to 2058 (1976), by W. J. Jackson, Jr. and H. F. Kuhfuss. See also U.S. Pat. No. 4,138,842 and commonly assigned U.S. Pat. No. 4,355,133 which are herein incorporated by reference.

Representative wholly aromatic and aromatic-aliphatic poly(ester-amides) which exhibit thermotropic liquid crystalline properties are disclosed in U.S. Pat. Nos. 4,272,625; 4,330,457; 4,339,375; 4,341,688; 4,351,917; 4,351,918; and 4,355,132. As discussed hereafter the poly(ester-amide) of U.S. Pat. No. 4,330,457 is particularly preferred for use in the present invention.

Representative aromatic polyazomethines which exhibit thermotropic liquid crystalline properties are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly (nitrilo-2-methyl-1,4-phenylenenitriloethylidyne-1,4phenyleneethylidyne); poly(nitrilo-2-methyl-1,4phenylenenitrilomethylidyne-1,4-phenylene-methylidyne); and poly(nitrilo-2-chloro-1,4-phenylenenitrilomethylidyne-1,4phenylenemethylidyne).

Representative aromatic polyester-carbonates which exhibit thermotropic liquid crystalline properties are disclosed in U.S. Pat. Nos 4,107,143, and 4,284,757, and in commonly assigned U.S. Ser. No 319,024, filed Nov. 6, 1981 (now U.S. Pat. No. 4,371,660), which are herein incorporated by reference. Examples of such polymers include those consisting essentially of p-oxybenzoyl units, p-dioxyphenyl units, dioxycarbonyl units, and terephthoyl units.

A thermotropic liquid crystalline polymer commonly is selected for use in the present invention which possesses a melting temperature within the range that is amenable to melt extrusion or molding while employing commercially available equipment. For instance, thermotropic liquid crystalline polymers are selected which exhibit a melting temperature somewhere within the range of approximately 250° to 400° C.

The thermotropic liquid crystalline polymer selected preferably also exhibits an inherent viscosity of at least 1.0 dl./g. when dissolved in a concentration of 0.1 percent by weight in pentafluorophenol at 60° C. (e.g., an inherent vicosity of approximately 1.0 to 15.0 dl./g.).

A particularly preferred wholly aromatic polyester for use in the present invention is that disclosed in U.S. Pat. No. 4,161,470 which is capable of forming an anisotropic melt phase at a temperature below approximately 350° C. This polyester consists essentially of the recurring moieties I and II wherein:

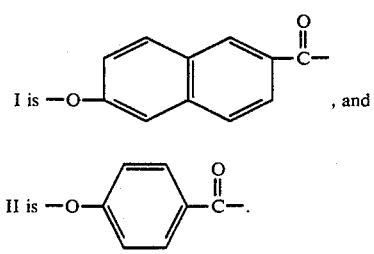

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 73 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof. Such polymer preferably has an inherent viscosity of approximately 3.5 to 10 dl./g. when dissolved in a concentration of 0.1 percent by weight of pentafluorophenol at 60° C.

Another particularly preferred wholly aromatic polyester for use in the present invention is that disclosed in U.S. Pat. No. 4,256,624 which is capable of forming an anisotropic melt phase at a temperature below approximately 400° C. This polyester consists essentially of the recurring moieties I, II, and III which may include substitution of at least some of the hydrogen atoms present upon an aromatic ring wherein:

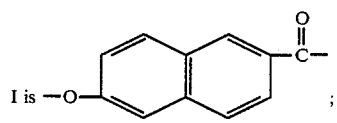

I is

II is a dioxy aryl moiety of the formula —O—Ar—O— where Ar is a divalent radical comprising at least one aromatic ring, and III is a dicarboxy aryl moiety of the formula

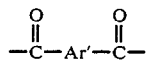

where Ar' is a divalent radical comprising at least one aromatic ring;
with said optional substitution if present being selected from the group consisting of an alkyl group of 1 to 4 carbon atoms, an alkoxy group of 1 to 4 carbon atoms, halogen, a phenyl group and mixtures of the foregoing, and wherein said polyester comprises approximately 10 to 90 mole percent of moiety I, approximately 5 to 45 mole percent of moiety II, and approximately 5 to 45 mole percent of moiety III.

A particularly preferred wholly aromatic poly(ester-amide) or aromatic-aliphatic poly(ester-amide) for use in the present invention is disclosed in U.S. Pat. No. 4,330,457, which is capable of forming an anisotropic melt phase at a temperature below approximately 400° C. The poly(esteramide)s there disclosed consist essentially of recurring moieties I, II, III, and, optionally, IV wherein:

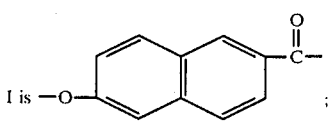

I is

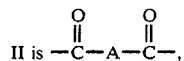

II is where A is a divalent radical comprising at least one aromatic ring or a divalent trans-1,4-cyclohexylene radical;

III is —Y—Ar—Z—, where Ar is a divalent radical comprising at least one aromatic ring, Y is O, NH, or NR, and Z is NH or NR, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV. The preferred dicarboxy aryl moiety II is:

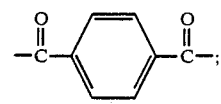

the preferred moiety III is:

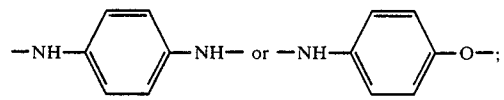

and the preferred dioxy aryl moiety IV is:

Such polymer preferably has an inherent viscosity of approximately 2.0 to 10 dl./g. when dissolved in a concentration of 0.1 percent by weight in pentafluorophenol at 60° C.

The liquid crystalline polymers may be formed and heat treated as is well known in the prior art as described in the patents incorporated by reference above.

When forming tape by extrusion for use in the present invention, the extrusion orifice may be selected from among those commonly utilized during melt extrusion. For instance, the shaped extrusion orifice may be in the form of a rectangular slit. The melt processable liquid crystalline polymer is supplied to the extrusion orifice at a temperature above its melting point.

Subsequent to extrusion through the shaped orifice the resulting tape is passed in the direction of its length through a solidification or quench zone wherein the molten tape is transformed to a solid.

The resulting tape optionally may be subjected to a thermal treatment whereby its physical properties are further enhanced. The tenacity of the tape particularly is increased by such thermal treatment. More specifically, the tape may be thermally treated in an oxygen-containing atmosphere (e.g., air) or in an inert atmosphere (e.g., nitrogen, argon or helium) with or without stress at a temperature below the polymer melting point until the desired property enhancement is achieved. The atmosphere in which the heat treatment is carried out is preferably flowing. Alternatively, the heat treatment may be carried out in a vacuum (e.g., 0.1 to 1 mm. of Hg) with or without a gaseous flow at such subatmospheric pressure. Thermal treatment times may range from a few minutes to several days, and commonly from about 1 to 6 hours. As the tape is thermally treated, its melting temperature progressively is raised. The temperature of the atmosphere may be staged or continuously increased during the thermal treatment, or held at a constant level. For instance, the tape may be heated at 250° C. for 1 hour, at 260° for 1 hour, and at 270° C. for 1 hour. Alternatively, the tape may be heated at about 15° to 20° C. below the temperature at which melts for about 48 hours. Optimum heat treatment conditions will vary with the specific composition and the inherent viscosity exhibited by the liquid crystalline polymers and may be determined by routine experimentation.

The unitary tapes formed from the liquid crystalline polymers for use in the present invention are fully oriented and exhibit highly satisfactory physical properties. For example, a tape formed from a wholly aromatic polyester produced in accordance with the teachings of U.S. Pat. No. 4,161,470, and consisting of 73.5 mole percent of recurring p-oxybenzyl units and 26.5 mole percent of recurring 6-oxy-2-naphthoyl units, illustrates typical properties. The tape was formed by extruding a polymer melt of the co-polymer at 301° C. through a slit die with cross-sectional dimensions of $1.78 \times 10^{-2}$ cm thickness and 0.635 cm width using a volume flow rate of 0.22 cm$^3$/min. and a take-up speed of 4.5 m./min. with a nitrogen quench flowing at 10 SCFH. This results in a tape 4.2 mm. wide by $2.1 \times 10^{-2}$ mm thick. Even before heat treatment, the tape had a tensile strength of $138 \times 10^{-3}$ psi and a modulus of $10.0 \times 10^6$ psi. Heat treatment would be expected to even further improve the properties.

In one embodiment of the present invention, the unitary tape used to make the flywheel is made of a continuously increasing thickness as winding proceeds. Such a tape can be formed by using an extrusion orifice in the form of a rectangular slit in which either the top or bottom of the slit is pulled away from the other edge at a predetermined rate which is designed to increase the tape thickness at the same rate as the stress would be expected to increase in a rotating flywheel as a function of the distance from the axis of rotation. The precise amount that the thickness would need to increase can be readily determined by one skilled in the art using standard equations.

In an alternative embodiment, the tape can be made with a level of modulus which is determined by the drawdown in the melt state. As stated above, after extrusion, the resulting tape is passed in the direction of its length through a solidification or quench zone wherein the molten tape is transformed to a solid tape. As a part of the extrusion process, a certain amount of drawing takes place. The drawing tends to orient the polymer in the direction of the draw such that the modulus increases as the tape is drawn further. Drawdown is typically stated as a ratio which is defined as the ratio of the take-up velocity to the average melt velocity at the die exit. Preferably this ratio is at least 2:1, and more preferably above 3:1. By continuously increasing the drawdown of the tape as the flywheel is wound, the modulus can be increased as a function of the distance of the tape from the center of the flywheel. Again the amount of increased drawdown necessary to produce a tape having a level of modulus at each location proportional to the increase stress resulting from the increased distance from the center of the flywheel can be readily determined by one skilled in the art. Such a configuration will result in the low modulus tape being used near the center of the flywheel with an increasing tape modulus near the periphery, yielding a relatively uniform strain throughout the flywheel during use. Accordingly, the tape would have a modulus substantially equivalent at all points to the degree of stress experienced during rotation of the flywheel.

In an alternative embodiment, liquid crystalline polymer compositions which increase substantially in modulus with heat treatment can be used to prepare the tape. Examples of such liquid crystalline polymers are disclosed in U.S. Pat. Nos. 4,184,996; 4,219,461; 4,224,433; 4,238,598; and 4,238,599 which are incorporated by reference above. In such an embodiment, a programmed heat treatment would be used to control the modulus of the tape as it is being wound into the flywheel. Typical thermal treatment conditions are set forth above. The degree to which the heat treatment should vary depending on the distance of the tape from the center of the flywheel can be readily determined by one skilled in the art.

One concept in the prior art to avoid the delamination problem was the use of a ballasted flywheel. In such a case, the stress is made more uniform by adding mass near the center of the flywheel, usually in the form of heavy powder such as lead, with a slight penalty in the energy/weight stored. Because the flywheels of the prior art used filaments, such ballasting was difficult to add. In contrast, by using liquid crystalline tape in the flywheels of the present invention, such ballasting is readily accomplished. Since a tape is being used, the heavy metal powders can be incorporated as a filler in the portion of the tape near the center of the flywheel, with the amount of filler decreasing as the periphery of the flywheel is approached. Alternatively, appropriate quantities of powder can be adhered to the tape immediately prior to winding. Because of the much simpler winding process involved in using liquid crystalline polymers, such ballasting is much more readily performed.

After forming the tape of liquid crystalline polymer for use in making the flywheels of the present invention, the tape can be coated with a small amount of a melt adhesive or a curable adhesive, suitable ones of which are well known to those skilled in the art, to give the flywheel integrity. An example of such a hot melt adhesive is #1946 Ethyl Vinyl Acetate Adhesive, (trademark of Adhesive Machinery Corporation, a Division of Dexter Corporation); and an example of such a curable adhesive is Shell Epoxy Epon A28 Adhesive with NMA Hardener (trademark of Shell Chemical Company).

The tape used in the present invention will typically be at least a couple of mils thick, and at least about 1/16th of an inch in width. However, the width can vary considerably depending on the size and shape of flywheel design. Often, very complex profiles are desired, which profiles can be more readily prepared using liquid crystalline polymer tape.

If a tape is used which is wider than certain portions of the flywheel, a slitting mechanism can be used to vary the width of the tape during winding. Such slitting mechanisms are well known in the prior art and any of those commercially available can be used. Since the liquid crystalline polymers of the present invention are thermoplastic in nature, scrap material can be conveniently recycled, in contrast to the prior art wherein scrap material is not reusable.

FIG. 1 illustrates a constant thickness profile flywheel which is readily formed in accordance with the present invention. Flywheel 10 of FIG. 1 has a width "a" which is constant across the flywheel.

In contrast, FIG. 2 illustrates a tapered thickness "Stodola" profile flywheel. At its center it has a thickness "a" the same as in FIG. 1, but at its outer edge, thickness "b" is only about two thirds of its center thickness. One method of forming a flywheel such as that illustrated in FIG. 2 would be to wind tape on a flywheel blank starting at the center 22 and proceeding outward in the direction indicated by arrow 24. As additional tape is wound onto the flywheel blank, a slitting mechanism could be used to reduce the width of the tape thereby giving the flywheel its characteristic profile.

FIG. 3 illustrates a side view of the flywheel 10 of FIG. 1 in which a tape of constant thickness is used to wind flywheel 10 proceeding from the center 30 to the outer periphery 32.

FIG. 4 illustrates the embodiment of the invention wherein a tape of a constantly increasing thickness is used to offset the increased stress experienced by portions of the flywheel 40 near the periphery. FIG. 4 has been drawn in an exaggerated form to illustrate that the tape increases in thickness proceeding from the center 42 to the outer periphery 44. Such a design allows the flywheel to stand up to stresses which would normally result in the catastrophic failure of the flywheel, ending in its disintegration.

While FIGS. 1-4 illustrate typical flywheel designs, it should be emphasized that various other flywheel designs of the prior art would also be more readily formed by utilizing a unitary tape of liquid crystalline polymer.

Although the invention has been described in terms of various preferred embodiments, one skilled in the art will appreciate that various modifications, substitutions, omissions, and changes can be made without departing from the spirit thereof. Accordingly, it is intended that the scope of the present invention be limited solely by the scope of the following claims.

What is claimed is:

1. A flywheel comprising a diametrically wound unitary tape of a thermotropic liquid crystalline polymer.

2. The flywheel of claim 1 wherein the tape increases in thickness as a function of the radial distance from the center of the flywheel.

3. The flywheel of claim 1 wherein the modulus of the tape increases as a function of the radial distance from the center of the flywheel.

4. The flywheel of claim 1 wherein the tape is heat treated to increase its modulus prior to being wound into a flywheel.

5. The flywheel of claim 1 wherein particulate ballast is incorporated within the tape during its formation, with decreasing amounts of ballast being incorporated at increasing radial distances from the center of the flywheel.

6. The flywheel of claim 1 wherein particulate ballast is adhered to the tape prior to winding, the amount of ballast decreasing at increasing radial distances from the center of the flywheel.

7. The flywheel of claim 1 wherein the thermotropic liquid crystalline polymer has an inherent viscosity of between about 1.0 and about 15 dl./g. when dissolved in a concentration of 0.1 percent by weight of pentafluorophenol at 60° C.

8. The flywheel of claim 1 wherein the thermotropic liquid crystalline polymer is selected from the group consisting of a wholly aromatic polyester, an aromatic-aliphatic polyester, a wholly aromatic poly(ester-amide), an aromatic aliphatic poly(ester-amide), an aromatic polyazomethine, an aromatic polyester-carbonate, and mixtures of the same.

9. The flywheel of claim 1, wherein the thermotropic liquid crystalline polymer is selected from the group consisting of a wholly aromatic polyester, a wholly aromatic poly(esteramide), an aromatic-aliphatic poly(ester-amide), and mixtures of the same.

10. The flywheel of claim 1, wherein the thermotropic liquid crystalline polymer is a melt processable poly(esteramide) capable of forming an anisotropic melt phase at a temperature below approximately 400° C. consisting essentially of recurring moieties I, II, III, and, optionally, IV wherein:

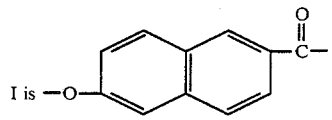

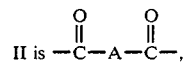

where A is a divalent radical comprising at least one aromatic ring or a divalent trans-1,4-cyclohexylene radical;

III is —Y—Ar—Z—, where Ar is a divalent radical comprising at least one aromatic ring, Y is O, NH, or NR, and Z is NH or NR, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

11. The flywheel of claim 1, wherein the thermotropic liquid crystalline polymer is a melt processable wholly aromatic polyester capable of forming an anisotropic melt phase at a temperature below approximately 400° C. consisting essentially of the recurring moieties I, II, and III which may include substitution of at least some of the hydrogen atoms present upon an aromatic ring wherein:

I is 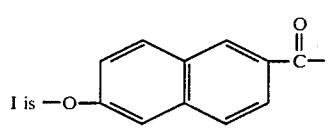

II is a dioxy aryl moiety of the formula —O—Ar—O— where Ar is a divalent radical comprising at least one aromatic ring, and III is a dicarboxy aryl moiety of the formula

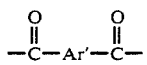

where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, a phenyl group and mixtures of the foregoing, and wherein said polyester comprises approximately 10 to 90 mole percent of moiety I, approximately 5 to 45 mole percent of moiety II, and approximately 5 to 45 mole percent of moiety III.

12. The flywheel of claim 1, wherein the thermotropic liquid crystalline polymer is a melt processable wholly aromatic polyester capable of forming a thermotropic melt phase at a temperature below approximately 350° C. consisting essentially of the recurring moieties I and II which may include substitution of at least some of the hydrogen atoms present upon an aromatic ring wherein:

I is 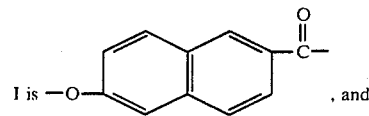, and

II is 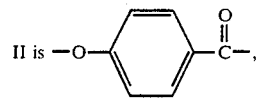, with said optional substitution if present being selected from the group consisting of an alkyl group of 1 to 4 carbon atoms, an alkoxy group of 1 to 4 carbon atoms, halogen, phenyl, and mixtures of the foregoing, and wherein said polyester comprises approximately 10 to 90 mole percent of moiety I, and approximately 10 to 90 percent of moiety II.

13. A process for preparing the flywheel of claim 1 comprising
   (a) extruding a tape of thermotropic liquid crystalline polymer,
   (b) winding the tape on a flywheel blank to form a flywheel, and
   (c) removing the flywheel blank.

14. The process of claim 13 wherein the tape is slit to an appropriate width as a part of the winding step.

15. The process of claim 13 wherein the extruded tape is heat treated prior to being wound into a flywheel.

16. The process of claim 13 wherein particulate ballast is blended with the thermotropic liquid crystalline polymer prior to extrusion.

17. The process of claim 13 wherein particulate ballast is adhered to the extruded tape prior to being wound into a flywheel.

18. The process of claim 13 wherein the extruded tape is coated with an adhesive prior to being wound into a flywheel.

19. The process of claim 13 wherein the extruded tape wound to form the flywheel increases in thickness as a function of the radial distance from the center of the flywheel.

* * * * *